United States Patent
Nespolo et al.

(10) Patent No.: US 9,598,010 B2
(45) Date of Patent: Mar. 21, 2017

(54) VISUAL ALERT SYSTEM

(71) Applicants: DENSO International America, Inc., Southfield, MI (US); DENSO CORPORATION, Kariya-shi, Aichi-ken (JP)

(72) Inventors: Martin Nespolo, Grosse Pointe Woods, MI (US); Kyle Golsch, Pontiac, MI (US); Sibu Varughese, Sterling Heights, MI (US); Vikas Upmanue, Farmington Hills, MI (US); Yu Zhang, Farmington Hills, MI (US); Justin McBride, South Lyon, MI (US); Laith Daman, Novi, MI (US); Cary Horvath, Dearborn, MI (US); Thomas Krzyzak, Jr., Livonia, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/925,193

(22) Filed: Oct. 28, 2015

(65) Prior Publication Data

US 2016/0288709 A1     Oct. 6, 2016

Related U.S. Application Data

(60) Provisional application No. 62/142,216, filed on Apr. 2, 2015.

(51) Int. Cl.
*B60Q 1/00*      (2006.01)
*B60Q 9/00*      (2006.01)
(Continued)

(52) U.S. Cl.
CPC .............. *B60Q 9/008* (2013.01); *B60K 35/00* (2013.01); *B60Q 1/2665* (2013.01)

(58) Field of Classification Search
CPC ...... B60Q 9/008; B60Q 9/004; B60Q 1/2665; B60K 35/00
(Continued)

(56) References Cited

U.S. PATENT DOCUMENTS 8,593,520 B2 * 11/2013 Hong ..................... H04N 7/181
                                                                       348/143
8,862,320 B2    10/2014 Kohlstrand et al.
(Continued)

OTHER PUBLICATIONS

In-vehicle lighting key to Continental 'driver focus' concept, Automotive Engineering Magazine, SAE International, Feb. 26, 2013.
(Continued)

*Primary Examiner* — Kerri McNally
(74) *Attorney, Agent, or Firm* — Harness, Dickey & Pierce, P.L.C.

(57) ABSTRACT

An alert system for a vehicle includes a tracking device, lighting system, control module, and sensor that can detect hazards. The tracking device can detect a driver's line-of-sight. The lighting system can be disposed about the vehicle and can emit light visible to the driver. The control module can determine a location of the hazard relative to the line-of-sight, and to operate the lighting system in a first mode in response to the hazard being outside of an angular threshold of the line-of-sight, and a second mode in response to the hazard being within the angular threshold. When in the first mode, a first region of the lighting system that corresponds to a general direction of the hazard can be illuminated. When in the second mode, a second region of the lighting system that corresponds to a specific location of the hazard is illuminated.

20 Claims, 4 Drawing Sheets

(51) Int. Cl.
*B60K 35/00* (2006.01)
*B60Q 1/26* (2006.01)

(58) Field of Classification Search
USPC .............................. 340/436, 425.5, 435, 438
See application file for complete search history.

(56) References Cited

U.S. PATENT DOCUMENTS

| 2006/0255956 | A1* | 11/2006 | Arakawa | B60K 28/066 |
| | | | | 340/576 |
| 2016/0009175 | A1* | 1/2016 | McNew | H04N 13/0484 |
| | | | | 340/438 |

OTHER PUBLICATIONS

Perifoveal Display: Combining Foveal and Peripheral Vision in one Visualization, Copyright 2012.

* cited by examiner

VISUAL ALERT SYSTEM

CROSS-REFERENCE TO RELATED APPLICATIONS

This application claims the benefit of U.S. Provisional Application No. 62/142,216, filed on Apr. 2, 2015, the entire disclosure of which is incorporated herein by reference.

FIELD

The present disclosure relates to a visual alert system.

BACKGROUND

This section provides background information related to the present disclosure, which is not necessarily prior art.

Current Advanced Driving Assistant Systems (ADAS), which are becoming more readily available as optional equipment, are limited to providing information for immediate hazards. They do not offer preemptive or anticipatory warnings for conditions that are not imminent, but could become so as driving conditions change.

Warning systems often focus on what is happening directly in front of the driver, limiting any predictive value of threats that may occur as driving conditions change within the vehicle's envelope. Knowing what is happening to the left, right, and/or rear of the vehicle and the ability to judge potential threats as that activity changes could increase the driver's ability to act before a threatening condition exists. For example, a fast moving truck in an alternate lane may not be an immediate threat, but it may become one as it approaches. If the driver in a vehicle ahead of the truck is aware that the truck is approaching, the driver may want to move into another lane.

Additionally, warnings are often delivered on an already crowded information center, which can cause a driver to ignore a warning or lose valuable reaction time identifying what triggered the warning/alert.

SUMMARY

This section provides a general summary of the disclosure, and is not a comprehensive disclosure of its full scope or all of its features.

The present teachings provide for a visual alert system for a vehicle and a method of operating the visual alert system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
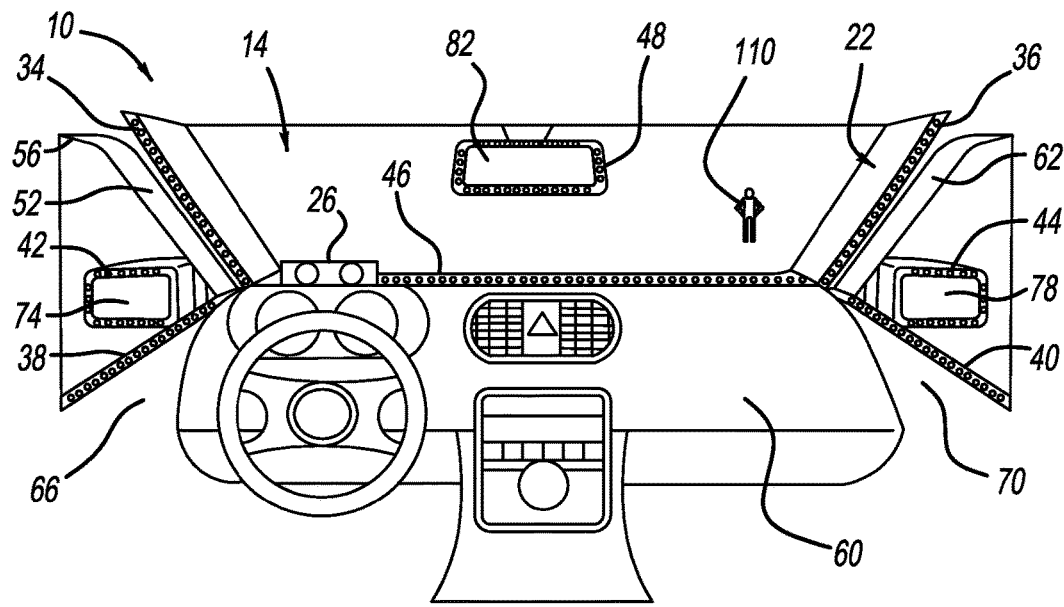
FIG. 1 is a perspective view of a visual alert system of a vehicle according to the present teachings.
Figure 3:
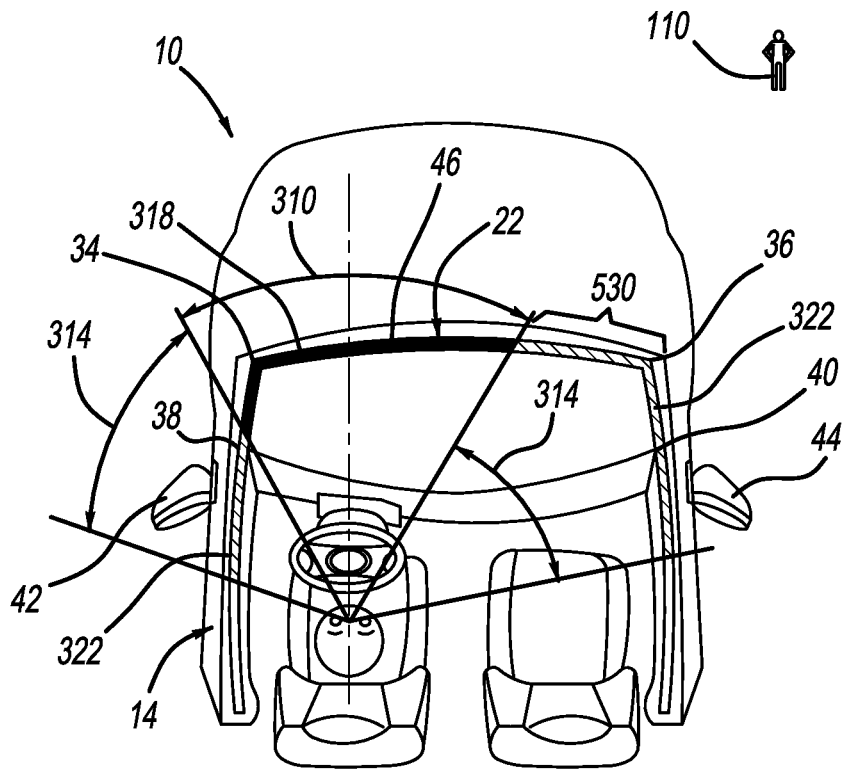
Figure 4:
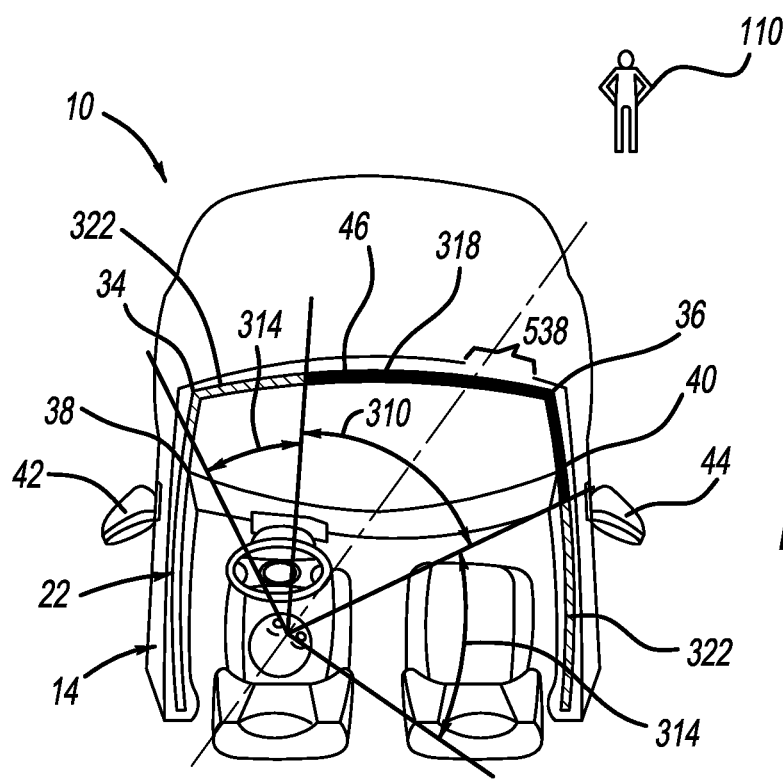
Figure 5:
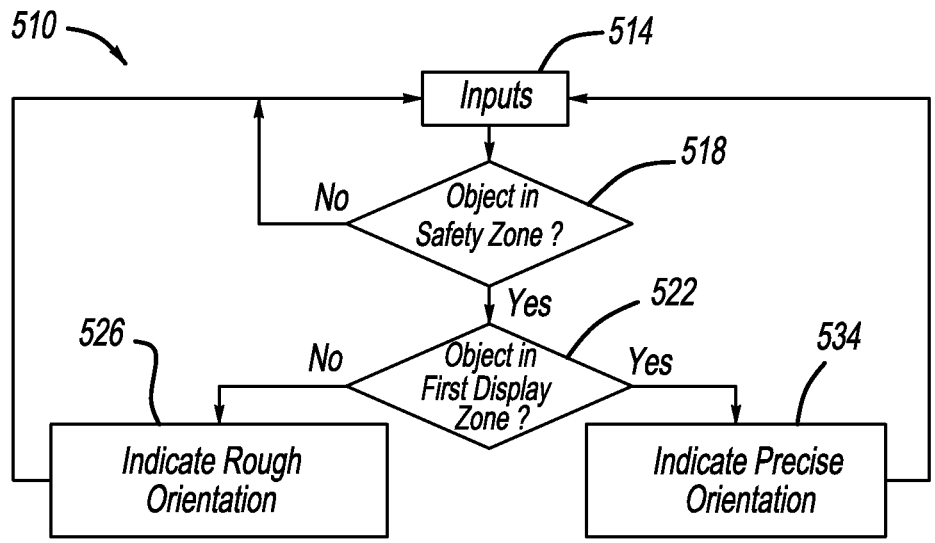
Figure 6:
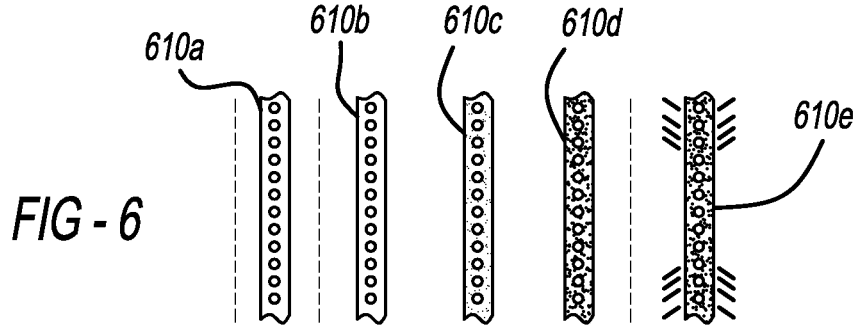
Figure 12:
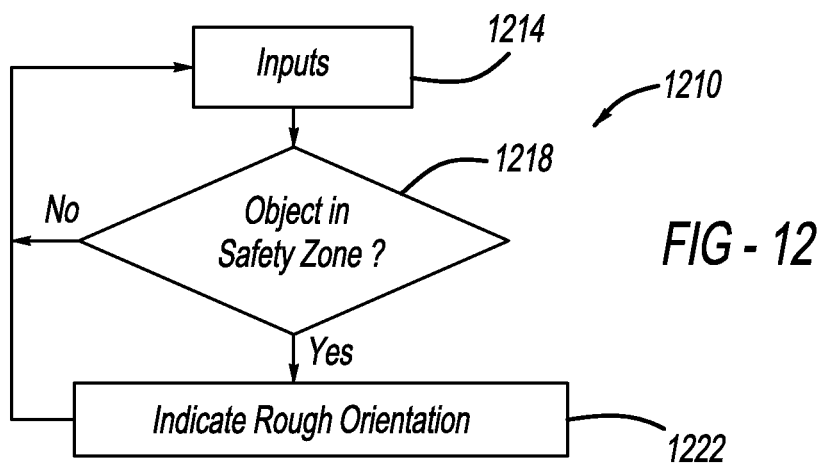
Figure 7:
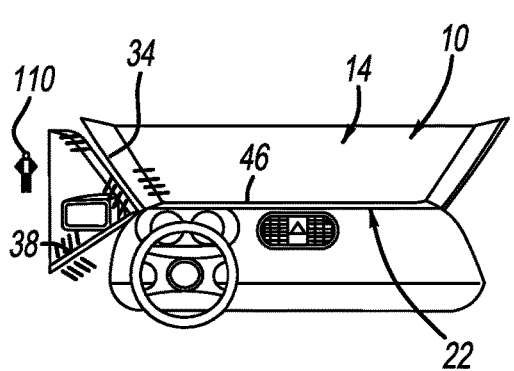
Figure 8:
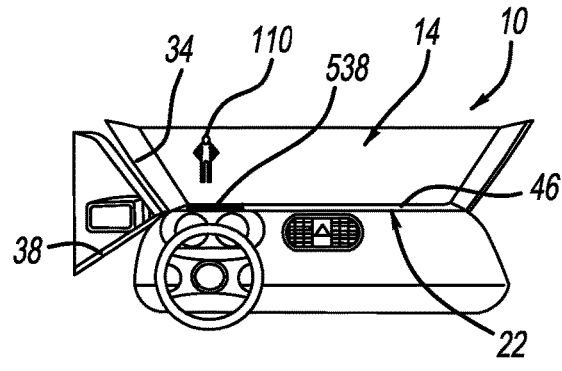
Figure 9:
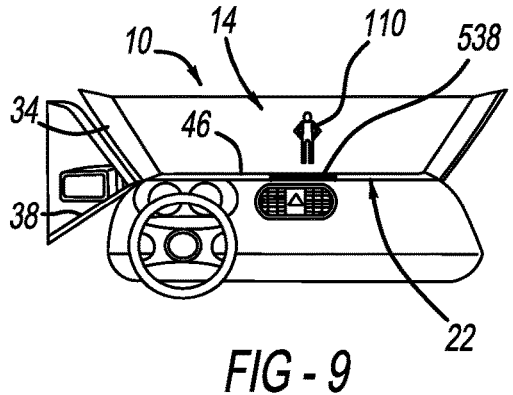
Figure 10:
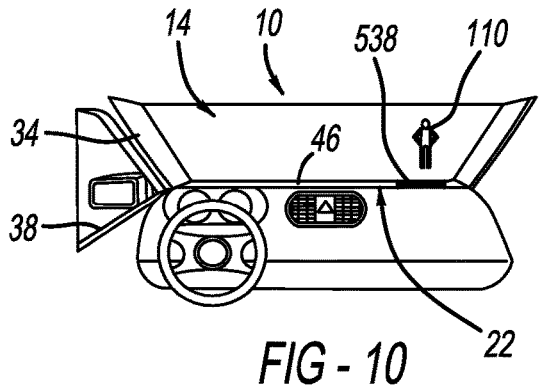
Figure 11:
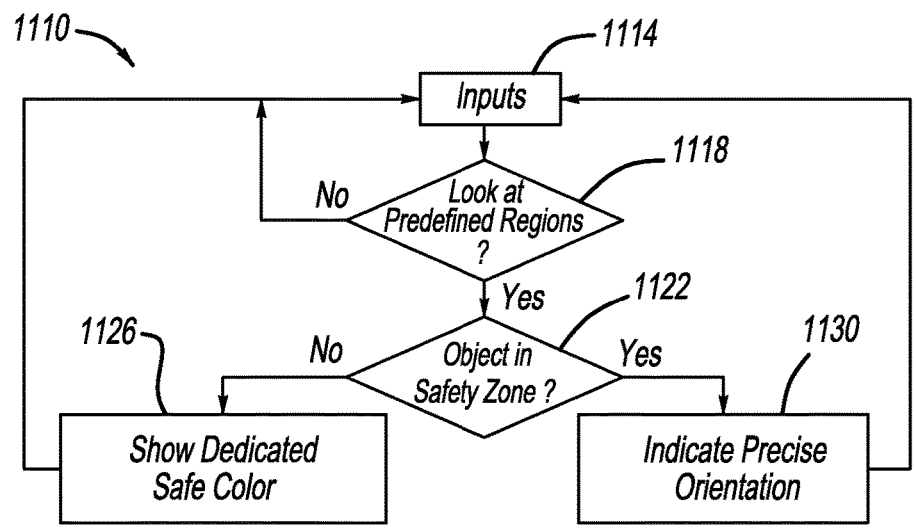

FIG. 3 identifies different display regions of the visual alert system of FIG. 1 when a driver is looking forward;

FIG. 4 identifies different display regions of the visual alert system of FIG. 1 when a driver is looking toward the right of the vehicle;

FIG. 5 is a flow chart of a first logic routine for controlling the visual alert system of FIG. 1;

FIG. 6 illustrates an example of how lights of the visual alert system of FIG. 1 can be illuminated based on positions of objects outside of the vehicle;

FIG. 7 is a perspective view similar to FIG. 1, illustrating how lights of the visual alert system can be illuminated when an object is detected in a first location;

FIG. 8 is a perspective view similar to FIG. 7, illustrating how the lights can be illuminated when the object is detected in a second location;

FIG. 9 is a perspective view similar to FIG. 8, illustrating how the lights can be illuminated when the object is detected in a third location;

FIG. 10 is a perspective view similar to FIG. 9, illustrating how the lights can be illuminated when the object is detected in a fourth location;

FIG. 11 is a flow chart of a second logic routine for controlling the visual alert system of FIG. 1; and FIG. 12 is a flow chart of a third logic routine for controlling the visual alert system of FIG. 1.

Corresponding reference numerals indicate corresponding parts throughout the several views of the drawings.

DETAILED DESCRIPTION

Example embodiments will now be described more fully with reference to the accompanying drawings.

The present teachings are directed toward a system that can monitor changing driving conditions, anticipate potential threats, and direct the driver's attention to the threat location to improve a driver's situational awareness. Advantageously, the system directs a driver's attention to potential threats by displaying warning lights in the same direction/orientation as the threat. The intensity of the light display can be dependent on the time to collision or impact (TTC). The display methods according to the present teachings can also be adjusted based on the relative angular distance between the threat and the driver's line of sight.

Figure 2:
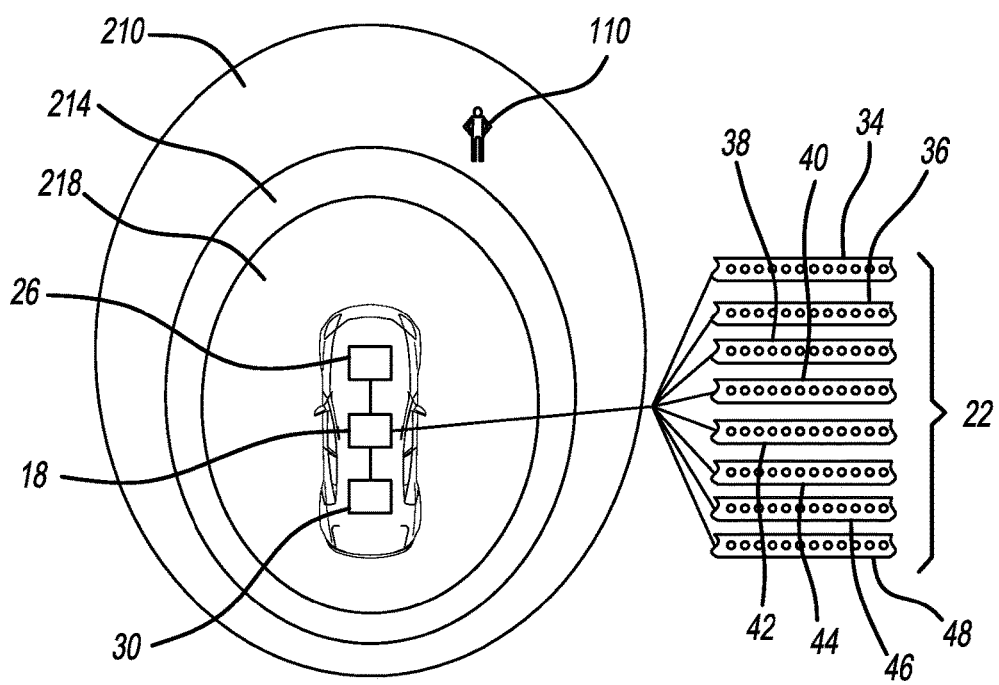
FIG. 2 is a schematic view of the vehicle and visual alert system of FIG. 1.

With reference to FIGS. 1 and 2, a vehicle 10 is illustrated having a visual alert system 14 in accordance with the present teachings. The visual alert system 14 can include a control module 18, a plurality of lights 22, a driver tracking device 26, and at least one first sensor 30. The lights 22 can be in communication with the control module 18 to be selectively operated by the control module 18. The lights 22 can include lights (e.g. LED bulbs) located in different areas within the vehicle 10 that can be visible to the driver of the vehicle 10. The lights 22 can also be configured to change colors or selectively emit light of different colors depending on input from the control module 18.

In the example provided, the lights 22 include first through eighth sets of lights 34, 36, 38, 40, 42, 44, 46, and 48, though other configurations can be used. The first set of lights 34 can be an array of lights that can be located along a left front pillar 52 (i.e. left A-pillar) and can extend between a headliner 56 and an instrument panel 60 of the vehicle 10. The second set of lights 36 can be similar to the first set of lights 34, but can be located along a right front pillar 62 (i.e. right A-pillar). The third set of lights 38 can be an array of lights that can be located along a left door panel 66, generally extending along the left door panel 66 toward the left front pillar 52. The fourth set of lights 40 can be similar to the third set of lights 38, but can be located along a right door panel 70. The fifth set of lights 42 can have an array of lights located on a left side mirror 74. In the example provided, the fifth set of lights 42 surrounds the periphery of the left side mirror 74. The sixth set of lights 44 can be similar to the fifth set of lights 42, but can be located on a right side mirror 78. The seventh set of lights 46 can be an array of lights that can be located along the instrument panel 60 between the left and right front pillars 52, 62 and proximate to the windshield of the vehicle. The eighth set of lights 48 can be an array of lights located on a rearview mirror 82. In the example provided, the eighth set of lights 48 surrounds the periphery of the rearview mirror 82. It is understood that additional lights can be located at additional or different locations within the vehicle 10. While the lights 22 are illustrated as being located generally within the front of the vehicle 10, lights can also be installed to cover the other areas of the interior of the vehicle 10. Some non-limiting examples of other locations include the rear windshield, rear passenger windows or doors, and roof liners.

The driver tracking device 26 can be any suitable device (e.g. a sensor) configured to detect where the driver's attention is focused (e.g. the direction that the driver is looking). For example the driver tracking device 26 can be configured to detect the position of the driver's eyes and/or head relative to the vehicle 10. In the example provided, the driver tracking device 26 is mounted on the instrument panel 60, though other configurations can be used. Some non-limiting examples of other locations include the rear windshield, rear passenger windows or doors, and roof liners. The driver tracking device 26 can alternatively include multiple sensors placed about different locations within the vehicle 10 to track the driver's attention. The driver tracking device 26 can be in communication with the control module 18.

With additional reference to FIG. 3, the driver tracking device 26 can monitor the driver's field of view, which can be separated into a primary vision area 310 and a peripheral vision area 314. For example, the primary vision area 310 can be 60° (i.e. 30° on either side of the driver's focus or natural line of sight), and the peripheral vision area 314 can be 45° on either side of the primary vision area 310, though other configurations can be used. Thus the primary vision area 310 and the peripheral vision area 314 can make up the driver's total field of view.

Returning to FIG. 2, the at least one first sensor 30 can include one sensor or a plurality of sensors that can detect locations and velocity of objects 110 outside of the vehicle 10, such as other vehicles, people, animals, plants, barriers, or curbs for example. The first sensors 30 can also be configured to detect conditions of the road and/or the environment in which the vehicle 10 is operating such as road surface, speed limit, weather, or temperature for example (e.g. a wireless, vehicle-to-infrastructure communication module). The first sensors 30 can also be configured to communicate with other vehicles or other objects outside of the vehicle 10 (e.g. a wireless, vehicle-to-vehicle communication module), or to detect a status of the vehicle 10 itself (e.g. position, velocity, operating condition). The first sensors 30 can be any suitable type of sensor such as radar, position sensors, speed sensors, lasers, sonar, microwave sensors, proximity sensors, or GPS for example. The first sensors 30 can be in communication with the control module 18.

Generally, driver safety decisions are associated with momentary safety margins based on traffic conditions. The time and space surrounding the vehicle 10 can be divided into various zones, such as a comfort zone 210, a safety zone 214, and a critical zone 218 for example. When a hazard or object 110 is in the comfort zone 210, the driver can comfortably avoid a possible accident with the object 110 (e.g. by steering braking and/or accelerating). When the object 110 is in the safety zone 214, the time pressure to maintain a safe distance from the object 110 is greater and the driver must react more quickly than in the comfort zone 210 to effectively avoid a possible accident with the object 110. In the critical zone 218, the driver must react immediately with precise and correct maneuvers in order to avoid an accident with the object 110.

These zones are typically defined by time to collision ("TTC") thresholds. TTC is defined as the distance between the driver's vehicle 10 and the detected object 110, divided by the relative speed between the vehicle 10 and the object 110. For example, the safety zone 214 can be defined as when the TTC value is 2 seconds or greater. The threshold boundary is determined by both the vehicle's 10 capability (e.g., maximum brake rate, maximum acceleration, maximum steering rate, or other imminent crash avoidance system) and drivers' own crash avoidance capability. One example of a critical zone 218 threshold is 0.8 seconds or less. In this non-limiting example, the safety zone 214 would be between 0.8 seconds and 2 seconds.

These thresholds can be changed to accommodate personal characteristics of the driver such as age, height, or experience. For example, the angles of the first and/or second display regions 318, 322 can be reduced for older drivers, less experienced drivers, or disabled drivers. The TTC thresholds for the zones 210, 214, 218 can also be modified based on the driver's own driving or risk-taking habits or predefined situational settings (e.g. normal mode, sport mode, track mode). Further, the thresholds can be changed based on different roadway features or conditions (e.g. GPS data, roadway databases, demographic information, weather). Thus, the present teachings support safe driving decisions based on this concept with inputs from multiple sensors and optionally the roadway features and driver characteristics.

The control module 18 can be configured to receive information from the first sensors 30, other roadway information (such as maps or databases for example stored in a memory or otherwise accessible by the control module 18), and vehicle 10 status to provide the control module 18 with an understanding of objects 110 or traffic relative to the vehicle 10. The control module 18 can use this information to identify potential safety threats from objects 110 around the vehicle 10 (e.g. in zones 210, 214, 218).

The control module 18 can be configured to selectively illuminate the lights 22 as objects 110 (e.g. potential hazards) enter into or exit from the different zones 210, 214, 218. For example, the control module 18 can control the color and intensity of the lights depending on the time and distance to a potential threat (e.g. the TTC). The control module 18 can also control which of the lights 22 (including individual bulbs within the sets of lights 34, 36, 38, 40, 42, 44, 46, 48) to draw the driver's focus (e.g. primary vision area 310) to the direction of the hazard. Thus, the control module 18 can illuminate the lights 22 based on the relative angular position between the object 110 and the driver's primary vision area 310. While not specifically shown, the control module 18 can also be configured to control directional audio and/or tactile cues from audio or haptic devices to supplement the lighting cues. It is understood that the control module 18 can be a single controller, or can include separate controllers (e.g. a sensor integrator, a light controller, a vehicle-to-infrastructure communication module, a vehicle-to-vehicle communication module).

With continued reference to FIGS. 1-3 and additional reference to FIG. 4, in one configuration of the visual alert system 14, the control module 18 can be configured to divide the lights 22 into a first display region 318 and a second display region 322 based on input from the driver tracking device 26 (e.g. based on the direction of the primary vision area 310 and the peripheral vision area 314). In other words, as the driver moves his/her head, the first and second display regions 318, 322 can change to correspond to the primary vision area 310 and the peripheral vision area 314, respectively. The control module 18 can be configured to control the lights of the lights 22 that fall within the first display region 318 separately from the lights that fall within the second display region 322.

For example, FIG. 3 illustrates the driver's focus being generally forward with the first display region 318 including the first set of lights 34, a portion of the third set of lights 38, and a portion of the seventh set of lights 46. While not specifically shown, the eighth set of lights 48 may also be entirely or partially within the first display region 318. In FIG. 3, the second display region 322 can include the second set of lights 36, a portion of the third set of lights 38, a portion of the fourth set of lights 40, the fifth set of lights 42, the sixth set of lights 44, and a portion of the seventh set of lights 46.

In FIG. 4, the driver's focus has changed, from that of FIG. 3, to be looking generally toward the right of the vehicle 10. In FIG. 4, the first display region 318 accordingly has moved from that shown in FIG. 3 to now include the second set of lights 36, a portion of the fourth set of lights 40, and a different portion of the seventh set of lights 46. While not specifically shown, the eighth set of lights 48 can be partially or entirely within the first display region 318 of FIG. 4. In FIG. 4, the second display region 322 can now include the first set of lights 34, a portion of the third set of lights 38, a portion of the fourth set of lights 40, the sixth set of lights 44, and a portion of the seventh set of lights 46.

With additional reference to FIG. 5, a logic routine 510 for use by the control module 18 to operate the lights 22 is illustrated in flow chart form. The logic routine 510 can be used to control a precision level of the warning of the object 110. The logic routine 510 can begin at step 514 and receive inputs from the various input devices (e.g. first sensors 30, driver tracking device 26, other databases, vehicle status). After step 514, the logic routine 510 can proceed to step 518.

At step 518, the control module 18 can determine if the object 110 is within either the safety zone 214 or within the critical zone 218. If the object 110 is not within either the safety zone 214 or the critical zone 218 (e.g. the object 110 is within the comfort zone 210), then the logic routine 510 can return to step 514. If the object 110 is within either the safety zone 214 or the critical zone 218, then the logic routine 510 can proceed to step 522.

At step 522, the control module 18 can determine if the object 110 is inside the first display region 318 (or is visible within the first display region 318 via one of the mirrors 74, 78, 82). If the object 110 is not within the first display region 318, then the logic routine can proceed to step 526.

At step 526, the control module 18 can illuminate a light or lights of the lights 22 that correspond to the rough orientation of the object 110. In the example shown in FIG. 3, the entire portion (e.g. segment 530) of the seventh set of lights 46 that is within the second display region 322 may be illuminated to draw the driver's attention toward the right. Alternatively, if the object 110 is only visible in the second display region 322 via one of the mirrors 74, 78, 82, then the fifth, sixth, or eighth set of lights 42, 44, 48 on the corresponding mirror 74, 78, 82 can be illuminated.

The light or lights 22 can also be illuminated with a specific color code that can correspond to a threat level. For example, the color can be red for a low TTC (e.g. critical zone 218), or yellow for a medium TTC (e.g. safety zone 214). The light or lights 22 can also be illuminated in a flashing or blinking mode that corresponds to the threat level. For example, the lights 22 can flash at increasing speeds as the TTC decreases and the threat becomes more imminent. After step 526, the logic routine 510 can return to step 514.

Returning to step 522, if the object 110 is within the first display region 318, then the logic routine can proceed to step 534. At step 534, the control module 18 can illuminate a light or lights 22 that correspond to the precise orientation of the object 110. In the example shown in FIG. 4, a precise segment 538 of the seventh set of lights 46, that is smaller than the segment 530, can be illuminated to draw the driver's line of sight to the object's 110 precise location. Alternatively, if the object 110 is only visible in the first display region 318 via one of the mirrors 74, 78, 82, then the fifth, sixth, or eighth lights 42, 44, 48 on the corresponding mirror 74, 78, 82 can be specifically illuminated. The lights 22 can similarly be color coded or can flash to correspond to a threat level. After step 534, the logic routine 510 can return to step 514.

Thus the warning/displaying precision of the detected object 110 can be determined by the relative direction of the detected object 110 with respect to driver's line of sight (e.g. primary vision area 310 or peripheral vision area 314). If a potential hazard is detected within the first display region 318, the lights 22 indicate the precise orientation of the detected object 110. If a potential safety hazard is detected within the second display region 322, the lights 22 indicate the rough orientation of the detected object 110.

When the object 110 is beyond the second display region 322, the lights 22 can be off. Thus, the lights 22 can be configured to only activate when a potential hazard enters the safety zone 214 or critical zone 218. The color and intensity of the lights 22 can change to reflect the proximity of the object 110 until the object 110 is no longer in the driver's safety zone 214 or critical zone 218. With additional reference to FIG. 6, an example of different illumination settings for the lights 22 is illustrated by example lights 610, different settings of which are indicated by reference numerals 610a, 610b, 610c, 610d, and 610e (collectively referred to herein as lights 610). The example lights 610 can correspond to any of the lights of the plurality of lights 22.

In the example shown, when the object 110 is not detected or is within the comfort zone 210, the lights 610a can be off or a predetermined safety color (e.g. green). When the object 110 is within the safety zone 214 but outside of the critical zone (e.g. 0.8 s<TTC<2 s), a three-grade color cue (e.g. yellow, orange, red; additionally or alternatively a three-grade brightness level) can indicate the proximity of the vehicle 10 relative to the detected object 110. For example, when the object 110 is a first distance from the vehicle 10, the lights 610b can be illuminated a first color (e.g. yellow); when the object 110 is a second distance from the vehicle 10 that is less than the first distance, then the lights 610c can be illuminated a second color (e.g. orange); when the object 110 is a third distance from the vehicle 10 that is less than the second distance, then the lights 610d can be illuminated a third color (e.g. red). When the detected object 110 is within the critical zone (TTC<0.8 s), the lights 610*e* can flash and/or increase in intensity or change to a different color.

As the driver's attention is directed by the lights 610 (i.e. lights 22) or the detected object 110 moves, the driver's head orientation relative to the object 110 may change. As a result, the detected object 110 may move from the second display region 322 into the first display region 318 and the precision of the displaying/warning may change accordingly.

For example, FIGS. 7-10 illustrate an example illumination sequence of the lights 22. In the example illumination sequence, the driver's focus begins forward while the object 110 moves from left to right across the driver's field of view. As illustrated in FIG. 7, the driver is initially focused on the forward roadway. A potential hazard (e.g., the cross-moving object 110) is detected in the second display region 322 from the left. As a result, all lights on the left hand side in the second display region 322 can be illuminated or flash (e.g. the first and third sets of lights 34, 38).

As illustrated in FIG. 8, as the target then moves into the first display region 318, the lights 22 in the first display region 318 can show the precise direction/orientation of the detected object 110. In the example provided, the segment 538 is a portion of the seventh set of lights 46 and is illuminated in the precise area of the object 110. As the driver's visual attention follows the object 110, the object 110 stays in the first display region 318. As illustrated in FIGS. 9 and 10, while the object 110 remains in the driver's primary vision area 310, the segment 538 moves such that the lights 22 always show the precise orientation of the detected object 110 until the object 110 is out of the driver's safety zone 214. Thus, the visual alert system 14 can proactively warn about potential hazards.

With additional reference to FIG. 11, a logic routine 1110 that can be used by the control module 18 to provide the driver with a quick understanding of the driving environment based on an intentional inquiry of the driver is illustrated in flow chart form. For example, the control module 18 can be configured to illuminate the lights 22 to assist the driver only when he/she checks predefined regions for potential hazards.

The logic routine 1110 can begin at step 1114 where the control module 18 can received inputs from input devices (e.g. first sensors 30, driver tracking device 26). After step 1114, the logic routine 1110 can proceed to step 1118.

At step 1118, the control module 18 can determine if the driver is looking at one of the predefined regions. The predefined region can be any region, such as the left side mirror 74, right side mirror 78, or rearview mirror 82 for example. The driver can also set his/her own preferred predefined regions. If the driver is not looking at the predefined region, then the logic routine 1110 can return to step 1114. If the driver is looking at a predefined region, then the logic routine 1110 can proceed to step 1122.

At step 1122, the control module 18 can determine if the object 110 is within the safety zone 214. If the object 110 is not within the safety zone 214, then the logic routine 1110 can proceed to step 1126.

At step 1126, the control module 18 can control the lights 22 to show a predefined safety color (e.g. green) in the predefined region. After step 1126, the logic routine 1110 can return to step 1114.

Returning to step 1122, if the object 110 is within the safety zone 214 (or the critical zone 218), then the logic routine 1110 can proceed to step 1130. At step 1130, the control module 18 can illuminate specific ones of the lights 22 to indicate the precise location of the hazard, and the proximity of the detected object 110 can be indicated by using color cues, intensity, or flashing similar to that described above. After step 1130, the logic routine 1110 can return to step 1114

With additional reference to FIG. 12, a logic routine 1210 for use by the control module 18 when the driver tracking device 26 is not included is shown in flow chart form. The logic routine 1210 can begin at step 1214 and receive inputs from input devices (e.g. first sensors 30), and proceed to step 1218.

At step 1218, the control module 18 can determine if the object 110 is within the safety zone 214. If the object 110 is not in the safety zone 214, the logic routine 1210 can return to step 1214.

If the object 110 is within the safety zone 214 (or critical zone 218), then the logic routine 1210 can proceed to step 1222. At step 1222, the control module 18 can control the lights 22 to illuminate the rough orientation/direction of the object 110. Pre-defined color codes and/or flashing similar to those discussed above can represent the proximity of the object 110. After step 1222, the logic routine 1210 can return to step 1214. Thus, the visual alert system 14 can draw the driver's attention toward the object 110 without the driver tracking device 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A visual alert system for a vehicle comprising:
   at least one sensor configured to detect a hazard outside the vehicle;
   a tracking device configured to detect a driver's line of sight;
   a lighting system disposed about the vehicle and operable to emit light visible to the driver;
   a control module configured to determine a location of the hazard relative to the driver's line of sight, and to operate the lighting system in a first mode in response to the hazard being located outside of a predetermined angular threshold of the driver's line of sight, and a second mode in response to the hazard being located within the predetermined angular threshold;
   wherein when in the first mode, a first region of the lighting system that corresponds to a general direction of the hazard is illuminated, and when in the second mode, a second region of the lighting system that corresponds to a specific location of the hazard is illuminated.

2. The visual alert system of claim 1, wherein the control module is configured to change an angular position of the second region relative to the driver as the hazard moves relative to the driver.

3. The visual alert system of claim 1, wherein the control module is configured to determine a time to collision with the hazard and to operate the lighting system based on the time to collision.

4. The visual alert system of claim 3, wherein the control module is configured to operate the lighting system to emit light in a plurality of colors that correspond to predetermined time to collision thresholds.

5. The visual alert system of claim 3, wherein the control module is configured to operate the lighting system to emit light in a flashing pattern in response to the time to collision being less than a predetermined time to collision threshold.

6. The visual alert system of claim 1, wherein the control module is configured to determine if the driver's line of sight is directed toward a predetermined region, wherein the control module is configured to operate the lighting system to emit light in response to the driver's line of sight being directed toward the predetermined region and the hazard being visible within the predetermined region.

7. The visual alert system of claim 6, wherein the control module is configured to operate the lighting system to emit light of a first predetermined color in response to the hazard being within a predetermined distance of the vehicle, and to emit light of a second predetermined color in response to the hazard being outside of the predetermined distance.

8. The visual alert system of claim 1, wherein the control module is configured to communicate with objects outside of the vehicle to receive location information about hazards.

9. A visual alert system for a vehicle comprising:
   at least one sensor configured to detect an object outside the vehicle;
   a tracking device configured to detect a driver's line of sight;
   a lighting system configured to emit light visible to the driver; and
   a control module configured to:
     receive inputs from theat least one sensor;
     receive inputs from the tracking device;
     determine a threat level of the object based on a location of the object relative to the vehicle;
     determine a first display region and a second display region of the lighting system based on a relative angular position between the object and the driver's line of sight; and
     operate one of the first or second display regions of the lighting system that corresponds to the location of the object relative to the vehicle and the threat level of the object.

10. The visual alert system of claim 9, wherein the first display region corresponds to an area within a first predetermined angular threshold of the driver's line of sight, and the second display region corresponds to an area outside of the first predetermined angular threshold and within a second predetermined angular threshold of the driver's line of sight.

11. The visual alert system of claim 9, wherein the control module is configured to communicate with the object or infrastructure elements and to receive location information of the object from the objects or the infrastructure elements.

12. The visual alert system of claim 9, wherein the control module is configured to receive roadway and traffic conditions and use the roadway and traffic conditions to determine the threat level.

13. The visual alert system of claim 9, wherein the control module is configured to monitor a driver's driving habits and use the driver's driving habits to determine the threat level.

14. The visual alert system of claim 9, wherein the lighting system includes a set of lights surrounding a mirror and the control module is configured to illuminate the set of lights surrounding the mirror to indicate an object visible in the mirror.

15. The visual alert system of claim 9, wherein control module is configured to illuminate a range of lights within the lighting system with at least one of a plurality of predetermined colors, the predetermined colors corresponding to a predetermined threat level.

16. The visual alert system of claim 9, wherein the first display region corresponds to a primary field of view of the driver and the second display region corresponds to a peripheral field of view of the driver.

17. A method of operating a visual alert system for a vehicle, the method comprising:
   detecting an object exterior to the vehicle;
   determining if the object is located less than a predetermined first distance from the vehicle;
   detecting a primary field of view of a driver of the vehicle;
   determining if the object is within the primary field of view of the driver;
   illuminating a set of lights that corresponds to a general location of the object relative to the vehicle in response to the object being outside the primary field of view; and
   illuminating a set of lights that corresponds to a specific location of the object relative to the vehicle in response to the object being within the primary field of view.

18. The method of claim 17, further comprising:
   illuminating a set of lights that correspond to a specific location of the object relative to the vehicle in response to the driver looking toward a predetermined region of the vehicle.

19. The method of claim 17, wherein a location of the set of lights that corresponds to the specific location of the object relative to the vehicle changes as the object moves through the primary field of view.

20. The method of claim 17, further comprising:
determining a threat level of the object; and
illuminating a set of lights that correspond to a location of the object relative to the vehicle with at least one of a plurality of predetermined colors based on the threat level of the object.

\* \* \* \* \*

UNITED STATES PATENT AND TRADEMARK OFFICE
CERTIFICATE OF CORRECTION

PATENT NO. : 9,598,010 B2
APPLICATION NO. : 14/925193
DATED : March 21, 2017
INVENTOR(S) : Martin Nespolo et al.

It is certified that error appears in the above-identified patent and that said Letters Patent is hereby corrected as shown below:

In the Claims

At Column 11, Claim number 9, Line number 66, delete "theat" and insert --the at--.

Signed and Sealed this
Sixteenth Day of May, 2017

Michelle K. Lee
*Director of the United States Patent and Trademark Office*